United States Patent [19]

Haas et al.

[11] Patent Number: 4,663,093
[45] Date of Patent: May 5, 1987

[54] PREPARATION OF NUCLEAR FUEL SPHERES BY FLOTATION-INTERNAL GELATION

[75] Inventors: Paul A. Haas, Knoxville; Victor L. Fowler; Milton H. Lloyd, both of Oak Ridge, all of Tenn.

[73] Assignee: The United States of America as represented by the United States Department of Energy, Washington, D.C.

[21] Appl. No.: 685,013

[22] Filed: Dec. 23, 1985

[51] Int. Cl.[4] ............... G21C 21/00; G21C 19/46; C01G 43/02

[52] U.S. Cl. ............... 264/0.5; 252/631; 252/635; 252/643; 264/14

[58] Field of Search ............... 264/0.5, 13–14; 252/634, 642–643, 635, 627; 423/26, 251, 253, 260, 261; 210/704, 705; 422/159, 140, 903; 425/10; 34/57 R

[56] References Cited

U.S. PATENT DOCUMENTS 2,543,132  2/1951  Shabaker ............... 252/448
2,820,984  1/1958  Spina et al. ............... 264/0.5
3,301,790  1/1967  Fitch et al. ............... 252/635
3,321,560  5/1967  Wilkinson ............... 264/0.5
4,060,497  11/1977  Huschka et al. ............... 264/0.5
4,124,535  11/1978  Farrington et al. ............... 252/448
4,397,778  8/1983  Lloyd ............... 252/627
4,415,536  11/1983  Haas et al. ............... 252/635

Primary Examiner—John F. Terapane
Assistant Examiner—Howard J. Locker
Attorney, Agent, or Firm—Stephen D. Hamel; Judson R. Hightower

[57] ABSTRACT

A simplified internal gelation process for the preparation of gel spheres of nuclear fuels. The process utilizes perchloroethylene as a gelation medium. Gelation is accomplished by directing droplets of a nuclear fuel broth into a moving volume of hot perchloroethylene (about 85° C.) in a trough. Gelation takes place as the droplets float on the surface of the perchloroethylene and the resultant gel spheres are carried directly into an ager column which is attached to the trough. The aged spheres are disengaged from the perchloroethylene on a moving screen and are deposited in an aqueous wash column.

9 Claims, 3 Drawing Figures

PREPARATION OF NUCLEAR FUEL SPHERES BY FLOTATION-INTERNAL GELATION

The United States Government has rights in this ivention pursuant to Contract No. W-7405-Eng-26 between the U.S. Department of Energy and Union Carbide Corporation, Nuclear Division.

BACKGROUND OF THE INVENTION

1. Field of the Invention and Contract Statement

This invention relates to a process for preparing gel spheres of nuclear fuel and to apparatus for conducting such process.

2. Division of Background and Prior Art

A sol gel process for the production of (U, Pu)O$_2$ nuclear fuel microspheres is disclosed in U.S. Pat. No. 4,397,778. Because of the higher gelation temperature (about 85° C.) required in such process, silicone oil is used as a gelation medium instead of trichloroethylene (TCE) which is used in conventional internal gelation processes for the preparation of UO$_3$ spheres. The use of silicone oil, which has higher viscosity and higher surface tension, has caused some difficulties particularly in a continuous mode of operation of the process. Recently, improvements to the process have been disclosed that overcome such difficulties. One of the improvements is a method by which the resistance of the surface tension and viscosity of the silicone oil are overcome by transporting the liquid droplets of a sol or broth into the silicone oil gelation medium by way of a jet stream of silicone oil. Another improvement uses a draft tube and vibrated screen for disengaging the gelled and aged spheres from silicone oil and then transporting the disengaged spheres into a trichloroethylene wash column where the silicone oil is washed from the outer surfaces of such spheres. The application of such improvements to the process has resulted in a continuous internal gelation process for producing nuclear fuel microspheres of predictable size and quality. However, the process is now more complex and more difficult to control and maintain, especially since remote operation is required. It is desirable to have a more simplified process with fewer steps, fewer equipment pieces to control, and one that is more amenable to scale-up and remote operation and maintenance.

U.S. Pat. No. 4,124,535 discloses a method of forming gelled spheres by suspending droplets of a slurry in a suspending liquid, such as, perchloroethylene. The slurry includes slurries made from metal oxides, but radioactive materials are not mentioned.

U.S. Pat. No. 3,321,560 discloses a method of making uranium dioxide spheres by suspension of a uranium dioxide slurry in trichloroethylene. There is no disclosure of dropping uranium spheres into a moving stream of hot solvent.

U.S. Pat. No. 2,820,984 teaches the production of regenerated cellulose pellets. As the drops or globules of regenerated cellulose are formed, they are first dropped into a coagulating bath wherein they are subjected to a preliminary limited regenerating action during which time a thin skin is caused to form on the drops. The bath is caused to flow without turbulence and eddy currents and serves to move the pellets out of the dropping zone.

SUMMARY OF THE INVENTION

An object of the invention is to provide a simple, continuous process for preparing gel spheres of nuclear fuel, such as, (UPu)O$_x$. Another object of the invention is to provide apparatus for conducting such process. Other objects and advantages of the invention are set out herein or are obvious herefrom to one ordinarily skilled in the art.

The objects and advantages of this invention are achieved by the process and apparatus of the invention.

To achieve the foregoing and other objects in accordance with the purpose of the invention, as embodied and broadly described herein. The invention involves an internal gelation process for the continuous preparation of nuclear fuels. The process includes moving a volume of hot perchloroethylene through a trough. Droplets of a nuclear fuel solution are directed into the moving volume of hot perchloroethylene. The droplets of nuclear fuel solution gel to form gel spheres while the droplets are floating on the surface of the moving volume of perchloroethylene. The resultant gel spheres drop into a vertical column of perchloroethylene, wherein the gel spheres of nuclear fuel age while floating as a bed at the top of vertical column. The aged gel spheres of nuclear fuel are separated from the perchloroethylene.

Preferably the hot perchloroethylene solution of the first step has temperature between about 75° and about 90° C., and most preferably it has a temperature of about 85° C. Preferably the nuclear fuel solution used in the second step is a U-Pu solution. The vertical column of step (c) is preferably an ager. Preferably the aged gel spheres from step (d) are transported on a moving screen, the entrained perchloroethylene draining off of the aged gel spheres, the drained gel spheres are washed in an aqueous wash column, the wash water is drained from the gel spheres and the aged gel spheres are dried. Also preferably the wash water contains ammonium hydroxide. The process of the invention can be used for both the production of virgin UO$_2$ fuels and the refabrication of (UPu)O$_2$ fuels recycled in fuel reprocessing systems. The invention also includes the aged gel spheres of nuclear fuel prepared by the invention process. The invention includes apparatus for continuously preparing aged gel spheres of nuclear fuel. The apparatus includes the vessel and means adapted to contain a flow of hot perchloroethylene therethrough, and means for injecting hot perchloroethylene into one end of a trough-shaped vessel, thereby causing the flow of hot perchloroethylene through the trough-shaped vessel. There is means for forming droplets of nuclear fuel solution and directing the droplets of nuclear fuel into the flow of hot perchloroethylene in the vessel means. The droplets of nuclear fuel rise to the surface of the flow of hot perchloroethylene and gel to form gel spheres of nuclear fuel floating on top of the flow of hot perchloroethylene. There is also column means containing perchloroethylene and attached to the other end of the vessel means so that the interface opening therebetween coincides with the top of the hot perchloroethylene in the vessel means. The gel spheres of nuclear fuel floating on the top of the hot perchloroethylene at the attachment interface are formed into the column means by the build up of floating gel spheres in the vessel means. The top of the perchloroethylene in the column means is below the attachment interface. The gel spheres entering the column means fall onto the top of the perchloroethylene therein. The gel spheres floating on the perchloroethylene in the column means age as they move to the bottom of the column means. Some perchloroethylene from the vessel means come over the attachment means into the column means. Further, there is means for removing the aged gel spheres from the bottom of the column means and separating such removed, aged gel spheres from entrained perchloroethylene.

Preferably the vessel means is a trough-shaped vessel. Preferably the injection means includes a horizontal pipe located in the one end of the vessel means below the top surface of the hot perchloroethylene in the vessel means, the hot perchloroethylene entering the vessel means through the pipe. Also, preferably another horizontal pipe is located in the one end of the vessel means above the horizontal pipe so that the bottom of the rim of the horizontal pipe positioned just above the top surface of the hot perchloroethylene, thereby, when too much hot perchloroethylene is fed into the vessel means, such excess hot perchloroethylene flows out another horizontal pipe so as to maintain the desired level of hot perchloroethylene in the vessel means. Preferably a first vertical baffle is located in the vessel means, the first vertical baffle extending below the top surface of the hot perchlorethylene and the bottom edge of the first baffle being above the bottom surface of the vessel means, and a second vertical baffle is located on the side of the first vertical baffle away from the entrance pipe, the top edge of the second vertical baffle being positioned a minimal distance below the top surface of the hot perchloroethylene in the vessel means, thereby preventing movement of the nuclear fuel droplets toward the entrance pipe or overflow pipe and helping to provide a nonturbulent flow of perchloroethylene in the downstream portion of the vessel means. The column means preferably contain a slow-moving, vertically-oriented ager.

Reference will now be made in detail to the present preferred embodiments of the invention, examples of which are illustrated in the accompanying drawings.

A BRIEF DESCRIPTION OF THE DRAWINGS

The accompanying drawings, which are incorporated in and form a part of the specification, illustrate the invention, and together with the description, serve to explain the principles of the invention. In the drawings.

DETAILED DESCRIPTION OF THE INVENTION

All parts, percentages ratios and proportions are on a weight basis unless otherwise stated herein or obvious herefrom to one ordinarily skilled in the art.

Figure 1:
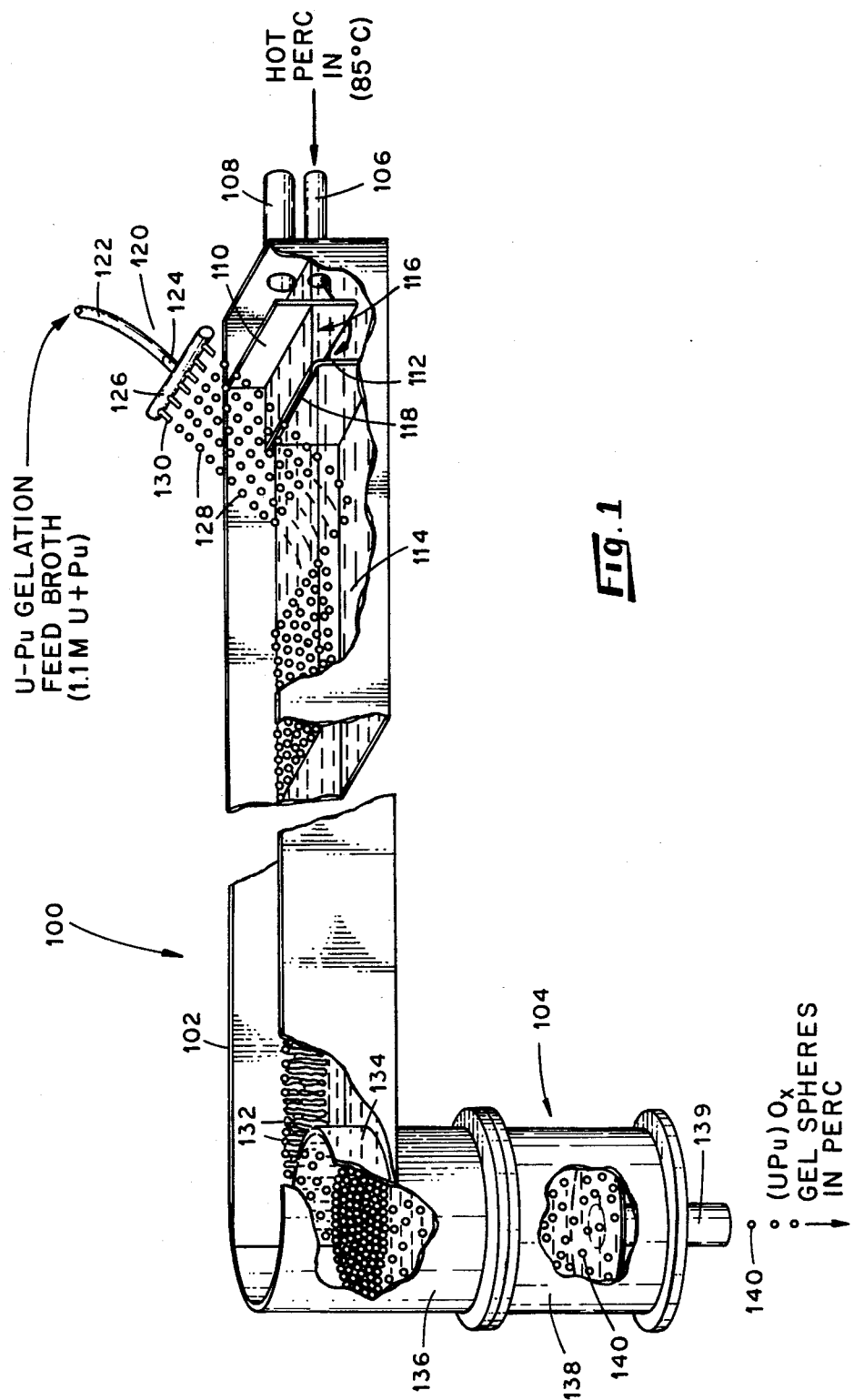
FIG. 1 is a perspective view, partly cut away of a float gelation trough and aging column in accordance with the invention.

FIG. 1 illustrates apparatus 100 for forming the invention aged gel spheres of nuclear fuel. According to the invention, apparatus 100 includes trough-shaped vessel 102, which is connected on its exit end to horizontal ager column 104. The entrance end of trough-shaped vessel 102 contains two horizontally-positioned pipes, namely, entrances pipe 106 and overflow pipe 108. Hot perchloroethylene, which is normally at about 85° C., enters into vessel 102 via entrance pipe 106 below the top surface of the perchloroethylene flowing in vessel 102. Near the entrance of pipe 16 into vessel 102 is located vertical baffle 100, which extends above the top surface of the perchlorethylene flowing in vessel 102. Baffle 110 does not extend all the way down to the bottom of vessel 102, so as to provide a passageway thereunder for the entering hot perchloroethylene from entrance pipe 106. A short distance down stream from vertical baffle 110 is located vertical baffle 112. Vertical baffle 112 extends all the way down to the bottom of vessel 102 and has a height which is slightly higher than the top surface of the perchloroethylene down stream portion of the flow in trough-shaped vessel 102. In this manner, there are two top surfaces of the perchloroethylene flow in vessel 102, that is, main flow portion 114 and entrance portion 116. The hot perchloroethylene entering into vessel 102 flows under baffle 110 and then seeps outwardly onto curved top portion 118 of second baffle 112. The use of baffles 110 and 112 helps to provide a smooth down stream flow of perchloroethylene without any turbulence caused by the entering of hot perchlorethylene via pipe 106. Exit pipe 108 is positioned such that its bottom rim is slightly above the normal height of upper perchloroethylene portion 116, so as to provide an overflow means when too much hot perchloroethylene enters via pipe 106. Device 120 injects metal solution droplets into the hot perchloroethylene flow 114 in vessel 102, which includes vertical tube 122, which is attached to short back nozzle 124 of cross pipe 126. As shown in FIG. 1, a U-Pu gelation broth is fed into pipes 122 and subsequently dispersed across the entire length of cross pipe 126. At that point, six streams 128 of the feed broth exit from six orifices 130, which are positioned on the float side of crossed pipe 126. The six short streams 130 are set at an angle of approximately 45° C. to the horizontal. The angle of pipes 130 plus the use of slightly pressurized feed broth in pipes 122 and cross pipe 126 cause droplets 128, which form from the exiting short jets 120, to be forced outwardly at a slight angle and then into perchloroethylene flow 114. Droplets 128 rise back to the surface of perchloroethylene flow 114 because the droplets of nuclear feed float on perchlorethylene. The slight flow of hot perchloroethylene in vessel 112 carries the floating droplets toward its exit end. As the droplets are carried along, the drops solidify into gelled spheres. The holding time from the entrance of the droplets into the perchloroethylene flow until the exit from the vessel of the gelled spheres is approximately 20 minutes. This time span allows the spheres to age. Also the baffle arrangement helps prevent the backward movement of the droplets of gelled spheres toward overflow pipe 108.

At this point, droplets 128 are designated in FIG. 1 as aged gelled spheres 132. Vertical column 104 interfaces with vessel 102 to form vertical wall 134. The top rim of vertical wall 134 is complete and establishes the maximum height of perchloroethylene flow 114 in vessel 102. The amount of perchloroethylene flow in vessel 102 is adjusted by the amount of perchloroethylene entering pipe 106 entrance as modified by exit pipe 108. Aged gelled spheres 132 approach the wall over the top edge of vertical pipe sections 136 and 138. Vertical column 104 contains perchloroethylene to a height below the top rim of vertical wall 134. The aged gelled spheres 132, which have fallen into vertical chamber 104 float on the top of the perchloroethylene in column 104 and exit via pipe 139 in the bottom of column 104. The fully aged gelled spheres are indicated in FIG. 1 by the numeral 140.

Some perchloroethylene also falls over the top of vertical wall 134 to constantly replenish the perchloroethylene in vertical chamber 104. Spheres 140 in the bottom of chamber 104 are also entrained in perchloroethylene.

Figure 2:
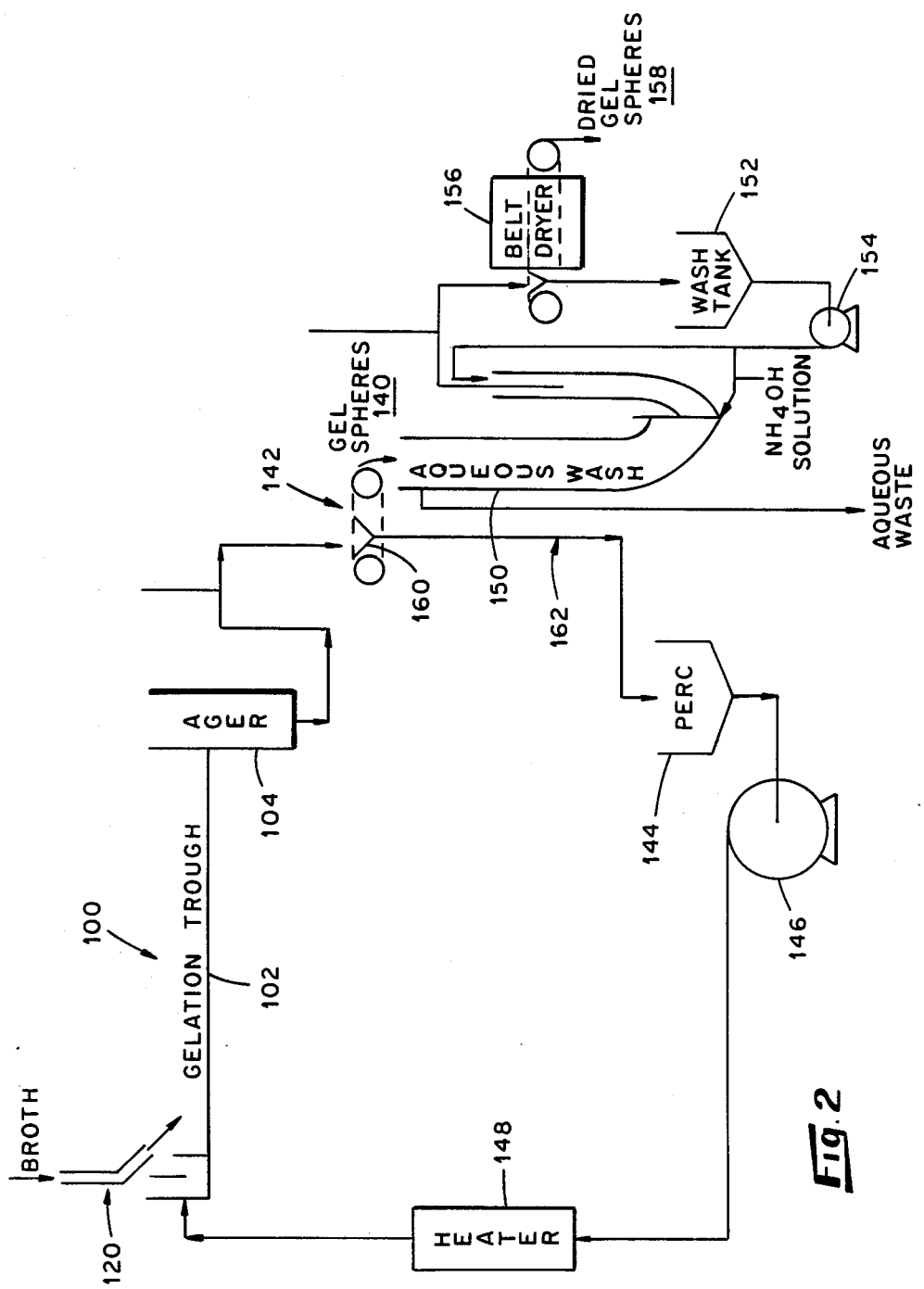
FIG. 2 is a schematic diagram of a continuous internal gelation process using float gelation in perchloroethylene in accordance with the invention.

Referring to FIG. 2, gelled spheres 140 in order to be drained of perchloroethylene, are deposited on moving conveyor 142 where the perchloroethylene is separated from aged gelled spheres 140. Moving conveyor 142 is a flexible screen which in effect allows the perchloroethylene to flow therethrough to funnel 160. The separated perchloroethylene passes down pipe 162 to holding tank 144 and then by means of pump 146 to heater 148 where it is heated to about 85° C.; and subsequently the heated perchloroethylene is recycled into gellation trough 102 via entrance pipe 106. Gelled spheres 140 which were separated from the perchloroethylene are deposited in aqueous wash column 150. After being washed and drained for approximately 5 minutes on the moving conveyor 142, gelled spehres 140 and chamber 150 are subjected to an ammonium hydroxide solution wash. The aqueous wash utilizes wash water from wash tank 152 is deposited in chamber 150 by means of pump 154. The wash water can also be used by intermixing with ammonium solution and the injected into chamber 150. After the aqueous solution and ammonium hydroxide-treated gel spheres 140 are removed, they are sent through belt dryer 150. The wash water is first drained off and recycled to wash tank 152. Drained gelled spheres 140 are subjected to moist air and belt drier 156. The result is dried gelled spheres 158.

The simpified apparatus provided by this invention comprises trough 102 and column 104—See FIG. 1. Gelation is accomplished by directing a stream of U-Pu broth droplets 128 from conventional nozzle 126 into a moving volume of hot (about 85° C.) perchloroethylene in trough-shaped vessel 12. The velocity of droplets 128 carries them into the perchloroethylene momentarily, after which, they rise to float on the surface until gelation is complete. Gelled spheres 132 are transported by the perchloroethylene stream into connecting aging column 104 in which a 20 minute holdup allows the spheres to age in the perchloroethylene. From ager 104 the spheres are transported onto moving screen 142 (See FIG. 2) where the perchloroethylene is removed from them, and they are deposited in an aqueous wash column 150.

Figure 3:
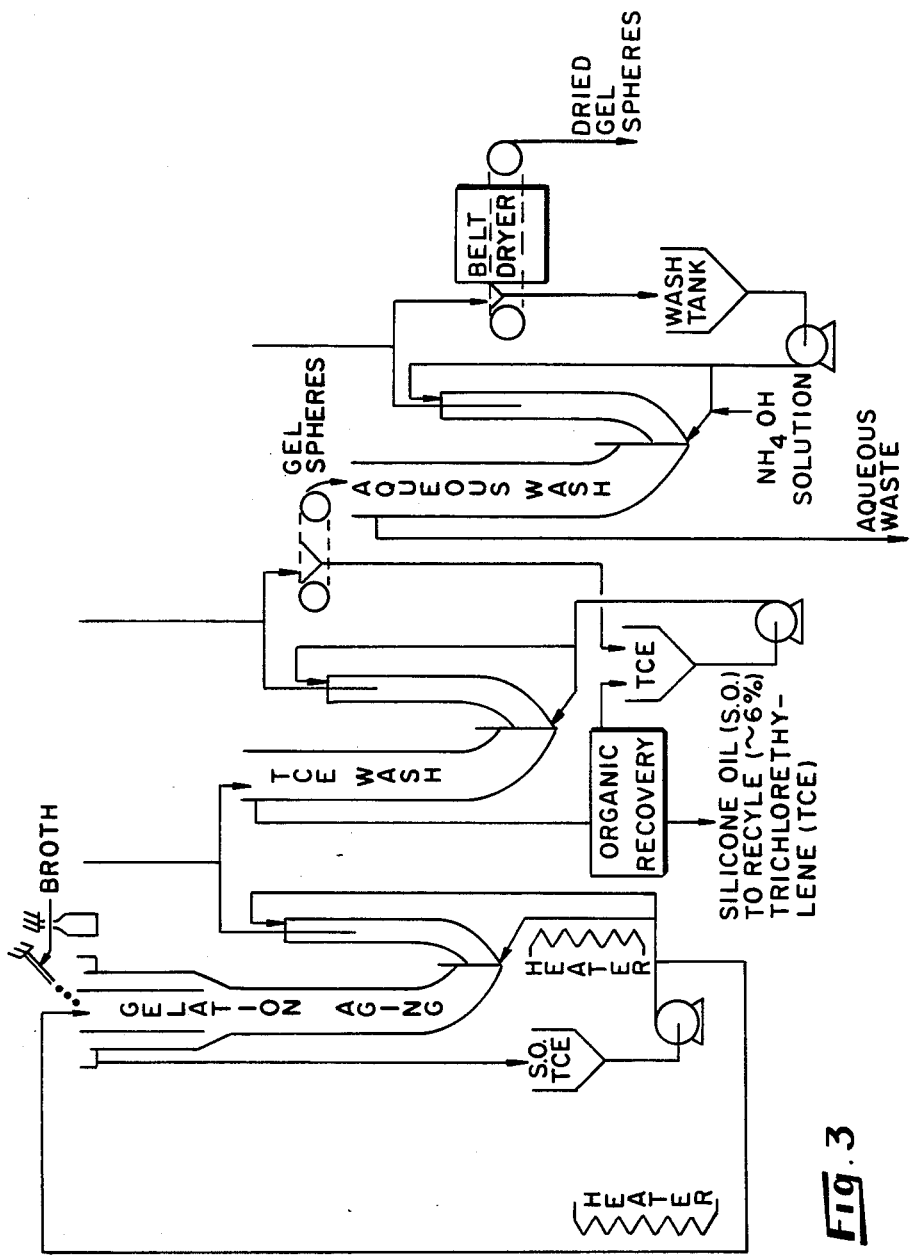
FIG. 3 is a schematic diagram of the prior art continuous internal gelation process using silicone oil and trichloroethylene wash.

The invention continuous gelation system using perchloroethylene (FIG. 2) is greatly simplified as compared to the prior art system using silicone oil (FIG. 3). A single flow of perchloroethylene replaces nine flows of silicone oil and trichloroethylene. The complex equipment and procedures for a trichloroethylene wash and for the organic recovery have been eliminated. Two difficult solid-liquid detection and control systems are replaced by a simple floating bed of spheres in the ager without any need for detection and control of a solids level. The perchloroethylene provides a nearly ideal combination of gelation temperature, easy removal from the gel, and nonflammability for the preparation of $(UPu)O_2$. The drops easily enter the PERC and the controlled jet-catcher stream used for silicone oil is not needed.

EXAMPLE

In this typical microsphere forming experiment, 31.5 ml of a metal feed solution, that was 0.64 M in Pu(NO$_3$)$_4$ and 2.00 M in A.D. UO$_2$(NO$_3$)$_2$ [$(Pu/(U+Pu)=0.236)$], was added to a feed pot and cooled to $-3°$ C. A.D. UO$_2$(NO$_3$)$_2$ means acid deficient uranyl nitrate equivalent to $UO_2(OH)_x(NO_3)_{2-x}$, where x may be between 0 and 0.6. The uranyl is partly hydrolyzed, but remains in solution. [During preparation, the metal feed solution was made acid deficient by the addition of NH$_4$OH to provide an unneutralized nitrate/metal mol ratio of 1.90.] A solution, that was 3.2 M in hexamethylenetetramine and 3.2 M in urea, was then slowly added to the feed pot (42.2 ml). The temperature was not allowed to increase above 0° C. during this addition.

This solution was dispensed by air pressurization of the feed pot to a vibrated nozzle that introduced 1 mm diameter droplets into the sphere forming trough that contained a flowing stream of perchlorethylene maintained at 85° C. The droplets gelled in about 10 seconds. The residence time in the trough was about 30 seconds. The gelled spheres flowed into a screen collector and were aged for 20 minutes in perchlorethylene at 85° C.

After aging, the spheres were allowed to drain for 5 minutes and were then batch washed four times in 3 M NH$_4$OH. The spheres were then dried at 110° C. in moist air.

Good quality microspheres were obtained in high yield (greater than 98%), and the tap density was 1.27 gm/cc which is in excellent agreement with the density obtained for spheres formed at 90° C. in silicone oil (1.25±0.02 gm/cc).

By way of summary, the invention involves a process for preparing gel spheres of $(UPu)O_x$ and other nuclear fuels. The process includes releasing droplets of U-Pu solution into a moving stream of hot perchoroethylene. The droplets form gel spheres which float on the surface of the moving perchloroethylene stream. The spheres are then dropped through a vertical column of perchloroethylene and are allowed to age. Finally, the spheres are subjected to an aqueous wash step and are allowed to dry. The invention also involves an apparatus in which hot, sphere-carrying perchloroethylene is transported, and a vertical column through which the gel spheres descend during the aging process.

The foregoing description of preferred embodiments of the invention has been presented for purposes of illustrated and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments and with various mdofications as are suited to the particular use contemplated. It is intended that the scope of the invention be defined by the claims appended hereto.

What is claimed is:

1. An internal gelation process for the preparation of nuclear fuels, comprising:
   (a) moving a volume of hot perchloroethylene through a trough;
   (b) directing droplets of a nuclear fuel solution into the moving volume of hot perchloroethylene, the droplets of nuclear fuel solution gelling to form gelled spheres while the droplets are floating on the surface of the moving volume of perchlorethylene;

(c) dropping the resultant gelled spheres into a vertical column of perchloroethylene, wherein the gelled spheres of nuclear fuel age as a floating bed in the vertical column; and (d) separating the aged gelled spheres of nuclear fuel from the perchlorethylene.

2. Process as claimed in claim 1 wherein the hot perchloroethylene solution of step (a) has a temperature between about 7° and about 90° C.

3. Process as claimed in claim 1 wherein the hot perchloroethylene solution has a temperature of about 85° C.

4. Process as claimed in claim 1 wherein the nuclear fuel solution used in step (b) is a $(UPu)O_2$ (U-Pu) solution.

5. Process as claimed in claim 1 wherein the vertical column of step (c) is an ager.

6. Process as claimed in claim 1 wherein the aged gel spheres from step (d) are transported on a moving screen, the entrained perchloroethylene draining off of the aged gel spheres, the drained gel spheres are washed in an aqueous wash column, the wash water is drained from the gel spheres and the aged gel spheres are dried.

7. Process as claimed in claim 1 wherein the wash water contains ammonium hydroxide.

8. The aged gel spheres of nuclear fuel prepared by process of claim 1.

9. The aged gel spheres of $(UPu)O_2$ prepared by the process of claim 4.

* * * * *